US011481452B2

(12) United States Patent
Mattivi et al.

(10) Patent No.: US 11,481,452 B2
(45) Date of Patent: Oct. 25, 2022

(54) SELF-LEARNING AND ADAPTABLE MECHANISM FOR TAGGING DOCUMENTS

(71) Applicant: Accenture Global Solutions Limited, Dublin (IE)

(72) Inventors: Riccardo Mattivi, Dublin (IE); Xin Zuo, Dublin (IE); Ian Hook, Prague (CZ); Aonghus McGovern, Dublin (IE); Thomas A. Hsu, Bellaire, TX (US); Bijay Kumar, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 194 days.

(21) Appl. No.: 16/200,825

(22) Filed: Nov. 27, 2018

(65) Prior Publication Data

US 2020/0167421 A1    May 28, 2020

(51) Int. Cl.
*G06F 16/93*    (2019.01)
*G06F 16/2457*    (2019.01)

(52) U.S. Cl.
CPC ........ *G06F 16/93* (2019.01); *G06F 16/24578* (2019.01)

(58) Field of Classification Search
CPC .. G06F 16/93; G06F 16/24578; G06F 16/374; G06F 16/355
See application file for complete search history.

(56) References Cited

U.S. PATENT DOCUMENTS

| 2007/0198506 | A1* | 8/2007 | Attaran Rezaei ... | G06F 21/6218 |
| 2008/0082466 | A1* | 4/2008 | Meijer ............... | G06N 7/005 706/12 |
| 2011/0307408 | A1* | 12/2011 | Gates ................ | G06Q 50/18 705/342 |
| 2014/0040275 | A1* | 2/2014 | Dang ................. | G06F 16/2228 707/741 |
| 2014/0114982 | A1 | 4/2014 | Lamba et al. | |
| 2016/0342581 | A1* | 11/2016 | Delgado ............ | G06F 3/04842 |

(Continued)

OTHER PUBLICATIONS

Baruzzo et al., "A General Framework for Personalized Text Classification and Annotation", Workshop on Adaptation and Personalization for Web 2.0, UMAP'09, Jun. 22-26, 2009, pp. 31-39.

(Continued)

*Primary Examiner* — Ashish Thomas
*Assistant Examiner* — Yohanes D Kelemework
(74) *Attorney, Agent, or Firm* — Fish & Richardson P.C.

(57) ABSTRACT

Implementations include providing a first set of tags by processing a document using generic entity extraction based on one or more external taxonomies, providing a second set of tags by processing the electronic document using specific entity extraction based on internal taxonomies specific to the enterprise, determining a relevance score for each tag in the first set of tags, and the second set of tags, defining a set of tags including one or more tags of the first set of tags, and one or more tags of the second set of tags, tags of the set of tags being in rank order based on respective relevance scores, receiving user input to the set of tags, and performing one or more of adjusting a ranking of tags based on the user input, and editing at least one internal taxonomy of the one or more internal taxonomies based on the user feedback.

15 Claims, 6 Drawing Sheets

(56) References Cited

U.S. PATENT DOCUMENTS

2017/0109358 A1    4/2017  Dhara et al.
2018/0060302 A1*  3/2018  Liang .................... G06F 40/289
2019/0220695 A1*  7/2019  Nefedov ............... G06F 16/334

OTHER PUBLICATIONS

EP Search Report in European Application No. EP 19211644, dated Mar. 30, 2020, 11 pages.

* cited by examiner

SELF-LEARNING AND ADAPTABLE MECHANISM FOR TAGGING DOCUMENTS

BACKGROUND

Enterprises can generate, and maintain hundreds, thousands, even millions of documents. In today's age, such documents are largely provided as electronic documents that can be stored in one or more databases within, or external to an enterprise. Enterprises often require relatively rapid search, and retrieval functionality to access documents that may be relevant to a particular topic (e.g., project, business unit, region). Information retrieval systems enable such functionality. In some information retrieval systems, documents are tagged with one or more tags. A tag can represent something that the document is relevant to, and searching of documents can be performed based on tags.

In some instances, tags used by an enterprise may be based on one or more taxonomies of the enterprise. For example, an enterprise can develop one or more taxonomies to represent words, names, business units, projects, acronyms, and the like that are relevant to the particular enterprise. In some instances, an enterprise can develop multiple taxonomies. For example, a taxonomy can be specific to manufacturing operations, another taxonomy can be specific to research and development operations, another taxonomy can be specific to human resources, and still another taxonomy can be specific to back-end business operations (e.g., accounting).

However, taxonomies can evolve over time. For example, words, names, acronyms can become more/less relevant to an enterprise over time. Consequently, particular tags can become more/less relevant over time. As another example, taxonomies can expand to add new tags (e.g., as technology evolves, and new technologies emerge). Maintaining taxonomies is a time, and resource-intensive task.

SUMMARY

Implementations of the present disclosure are generally directed to tagging electronic documents. More particularly, implementations of the present disclosure are directed to a self-learning and adaptable mechanism for tagging electronic documents.

In some implementations, actions include providing a first set of tags by processing an electronic document of an enterprise using generic entity extraction based on one or more external taxonomies, each external taxonomy being generic to operations of the enterprise, providing a second set of tags by processing the electronic document using specific entity extraction based on one or more internal taxonomies, each internal taxonomy being specific to the enterprise, determining a relevance score for each tag in the first set of tags, and the second set of tags, defining a set of tags including one or more tags of the first set of tags, and one or more tags of the second set of tags, tags of the set of tags being in rank order based on respective relevance scores, receiving user input to the set of tags, and performing one or more of adjusting a ranking of tags based on the user input, and editing at least one internal taxonomy of the one or more internal taxonomies based on the user feedback. Other implementations of this aspect include corresponding systems, apparatus, and computer programs, configured to perform the actions of the methods, encoded on computer storage devices.

These and other implementations can each optionally include one or more of the following features: actions further include assigning one or more tags of the set of tags to the electronic documents; adjusting a ranking of tags includes one of increasing a relevance score, and decreasing a relevance score of at least one tag in the set of tags; the relevance scores are determined based on processing each tag in the set of tags using term frequency inverse document frequency (TF-IDF); editing at least one internal taxonomy of the one or more internal taxonomies includes adding at least one term within a hierarchy of the at least one internal taxonomy; editing at least one internal taxonomy of the one or more internal taxonomies is based on a word embedding cloud that is generated from a set of documents; the set of documents includes one or more documents of the enterprise, each document having one or more tags assigned thereto.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Implementations of the present disclosure are generally directed to tagging electronic documents. More particularly, implementations of the present disclosure are directed to a self-learning and adaptable mechanism for tagging electronic documents. In some implementations, actions include providing a first set of tags by processing an electronic document of an enterprise using generic entity extraction based on one or more external taxonomies, each external taxonomy being generic to operations of the enterprise, providing a second set of tags by processing the electronic document using specific entity extraction based on one or more internal taxonomies, each internal taxonomy being specific to the enterprise, determining a relevance score for each tag in the first set of tags, and the second set of tags, defining a set of tags including one or more tags of the first set of tags, and one or more tags of the second set of tags, tags of the set of tags being in rank order based on respective relevance scores, receiving user input to the set of tags, and performing one or more of adjusting a ranking of tags based on the user input, and editing at least one internal taxonomy of the one or more internal taxonomies based on the user feedback.

As described in further detail herein, the document tagging platform of the present disclosure automatically extracts tags from documents in view of evolving user preferences, and the evolving document corpus. In some implementations, the document tagging platform includes a self-learning and adaptable mechanism that ranks tags based on user preferences, and a self-learning mechanism that adapts taxonomies based on user re-ranking patterns, and conceptual similarities between words derived from historical documents. An output of the document tagging platform includes a set of tagged documents that automatically maintains the underlying taxonomy. In some examples, the tags facilitate, enhance, and personalize tasks (e.g., search, content recommendation, document categorization).

Figure 1:
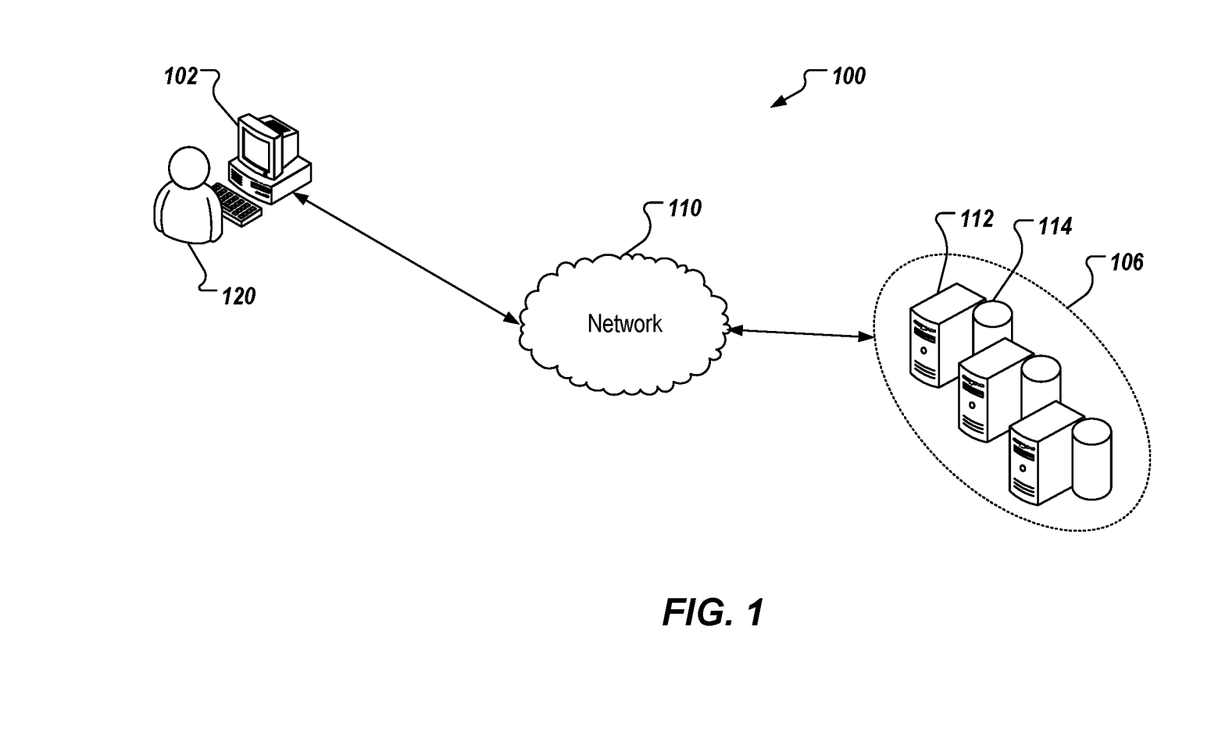
FIG. 1 depicts an example system that can execute implementations of the present disclosure.

FIG. 1 depicts an example system 100 that can execute implementations of the present disclosure. The example system 100 includes a computing device 102, a back-end system 106, and a network 110. In some examples, the network 110 includes a local area network (LAN), wide area network (WAN), the Internet, or a combination thereof, and connects web sites, devices (e.g., the computing device 102), and back-end systems (e.g., the back-end systems 106). In some examples, the network 110 can be accessed over a wired and/or a wireless communications link. For example, mobile computing devices, such as smartphones can utilize a cellular network to access the network 110.

In the depicted example, the back-end system 106 includes at least one server system 112, and data store 114 (e.g., database). In some examples, the at least one server system 112 hosts one or more computer-implemented services that users can interact with using computing devices. For example, the server system 112 of the back-end system 106 can host a document tagging platform in accordance with implementations of the present disclosure.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, a user 120 uses the computing device 102 to interact with the computer-implemented document tagging platform of the present disclosure. In some examples, and as described in further detail herein, the document tagging platform can process a document based on one or more external taxonomies, and one or more internal taxonomies to provide a set of tags to the user 120. In some examples, a taxonomy provides a hierarchy of categories, and sub-categories of one or more topics. In some examples, each category, or sub-category can be provided as a tag. For example, a computer-programming taxonomy can include a category of programming languages, and sub-categories of Java, C++, Python, and the like. Consequently, a document that is relevant to Java can be tagged with a programming languages tag, and a Java tag.

In accordance with implementations of the present disclosure, the tags in the set of tags are in ranked order based on respective scores assigned thereto. The user 120 can review the set of tags, and provide user input indicating feedback to the document tagging platform. Example feedback can include, without limitation, changing a ranking of a tag, removing a tag, adding a tag. As described in further detail herein, the document tagging platform can adjust subsequent ranking processes based on the feedback, and/or can adjust the one or more taxonomies based on the feedback.

Figure 2:
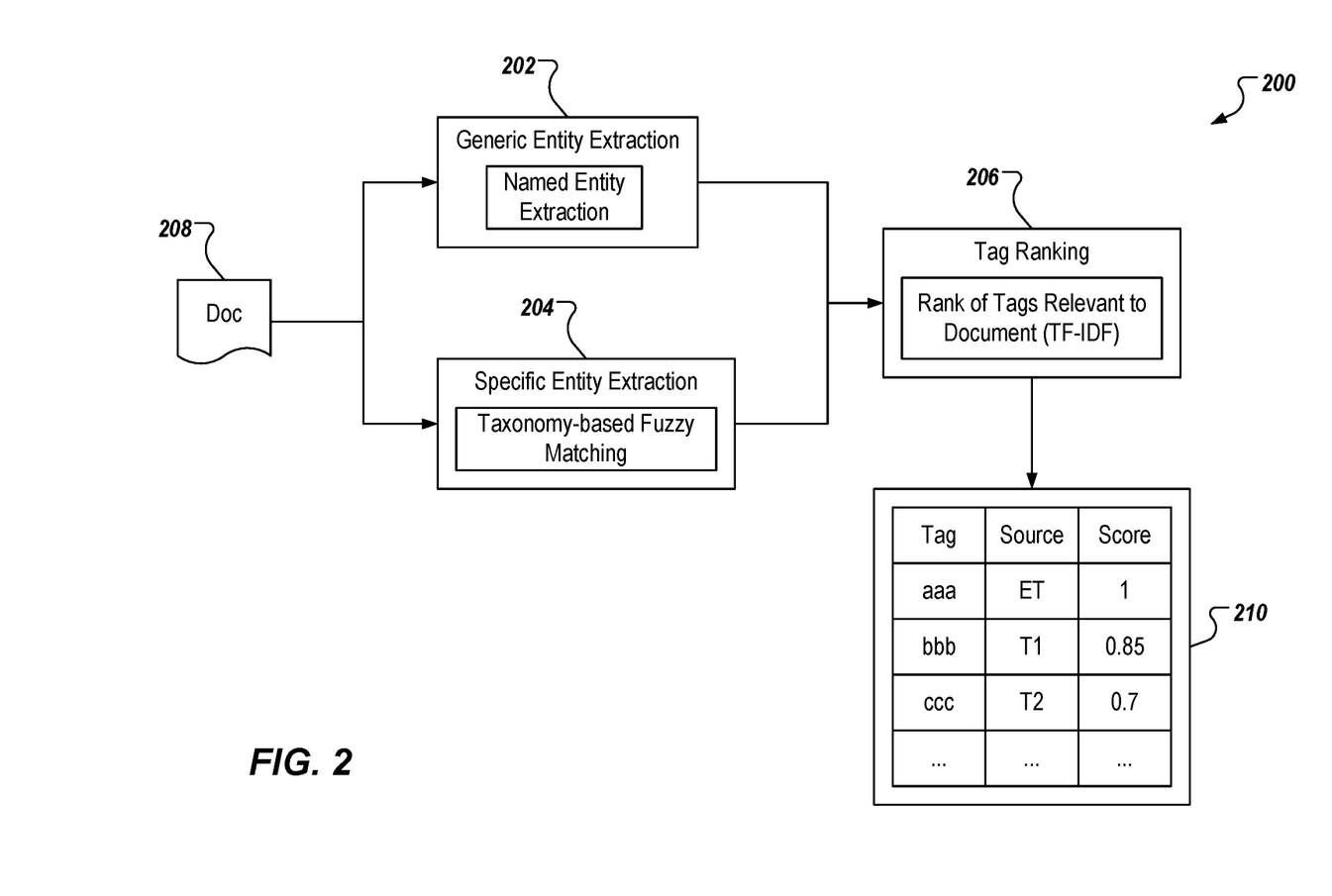
FIG. 2 depicts an example module architecture in accordance with implementations of the present disclosure.

FIG. 2 depicts an example module architecture 200 in accordance with implementations of the present disclosure. The example module architecture 200 includes a generic entity extraction (GEE) module 202, a specific entity extraction (SEE) module 204, and a tag ranking module 206. As described in further detail herein, the GEE module 202, and the SEE module 204 each process a document 208 to provide respective tags. The tags are ranked by the tags ranking module 206, and a tag rank 210 is provided as output.

In some implementations, the GEE module 202 processes the document 208 based on one or more taxonomies that are not specific to an enterprise that maintains the document 208. Consequently, the one or more taxonomies can be referred to as generic taxonomies. An example generic taxonomy can include that encoded in DBpedia provided by the DBpedia Association of Leipzig, Germany. Using DBpedia as a non-limiting example, the GEE module 202 can be at least partially provided using DBpedia Spotlight, which can be described as a tool for automatically annotating mentions of DBpedia resources in text. In accordance with implementations of the present disclosure, DBpedia Spotlight can process the document 208 to identify one or more entities that are relevant to the document 208, a tag being provided for each entity. The GEE module 202 processes the document 208 to provide a first set of tags.

In some implementations, the SEE module 204 processes the document 208 based on one or more taxonomies that are specific to the enterprise that maintains the document 208. Consequently, the one or more taxonomies can be referred to as specific (enterprise-specific) taxonomies. For example, taxonomies can be respectively specific to manufacturing operations, research and development operations, human resources, and back-end business operations of the enterprise.

The SEE module 204 processes the document 208 to provide a second set of tags. By way of non-limiting example, the SEE module 204 can match words in the document 208 to words of the one or more taxonomies using an edit distance. An example edit distance can include the Levenshtein distance, which is a string metric for measuring the difference between two sequences of characters. For example, a distance of 0 indicates an exact match, and as distance values increase, the mis-match increases. In some examples, a threshold distance can be provided. If the distance between a word in the document, and a word in the taxonomy does not exceed the threshold, it can be determined that a match exists.

In some implementations, the tag ranking module 206 receives the first set of tags, and the second set of tags, and provides a set of tags. In some examples, the set of tags includes unique tags from the first set of tags, and the second set of tags. For example, if a tag is included in both the first set of tags, and the second set of tags, the tag is included once in the first set of tags. In some examples, a source of the tag is indicated. For example, if the tag was assigned by using an external taxonomy (e.g., DBpedia) the source is indicated as such (e.g., ET). As another example, if the tag was assigned using a first specific taxonomy (e.g., human resources taxonomy) the source is indicated as such (e.g., T1). As another example, if the tag was assigned using a second specific taxonomy (e.g., research and development taxonomy) the source is indicated as such (e.g., T2).

In some implementations, the tag ranking module 206 determines a relevance score for each tag, the relevance score representing a degree of relevance of the tag to the document 208. In some examples, the relevance score is provided within a range (e.g., 0-1, with 0 indicating no relevance, and 1 indicating highly relevant). In some examples, the tag ranking module 206 implements term frequency inverse document frequency (TF-IDF) to determine a relevance score for a respective tag. In general, TF-IDF can be described as a numerical statistic that indicates how important a word is to a document (e.g., in the document 208) in a set of documents. In some examples, the set of documents includes documents provided in a knowledge exchange system of the enterprise, and excludes other documents (e.g., contracts are not included in the set of documents). The relevance score, based on the TF-IDF value, increases proportionally to the number of times a word appears in the document, and is offset by the number of documents in the set of documents that contain the word.

In some implementations, the tag ranking module 206 outputs the tag rank 210. In some examples, the tag rank includes the set of tags in rank order based on the respective relevance scores. For example, tags having higher relevance scores are ranked higher, while tags having lower relevance scores are ranked lower.

In accordance with implementations of the present disclosure, and as introduced above, one or more users (e.g., the user 120 of FIG. 1) can review the set of tags, and provide user input indicating feedback to the document tagging platform. Example feedback can include, without limitation, changing a ranking of a tag, removing a tag, adding a tag. As described in further detail herein, the document tagging platform can adjust subsequent ranking processes based on the feedback, and/or can adjust the one or more taxonomies based on the feedback.

Figure 3A:
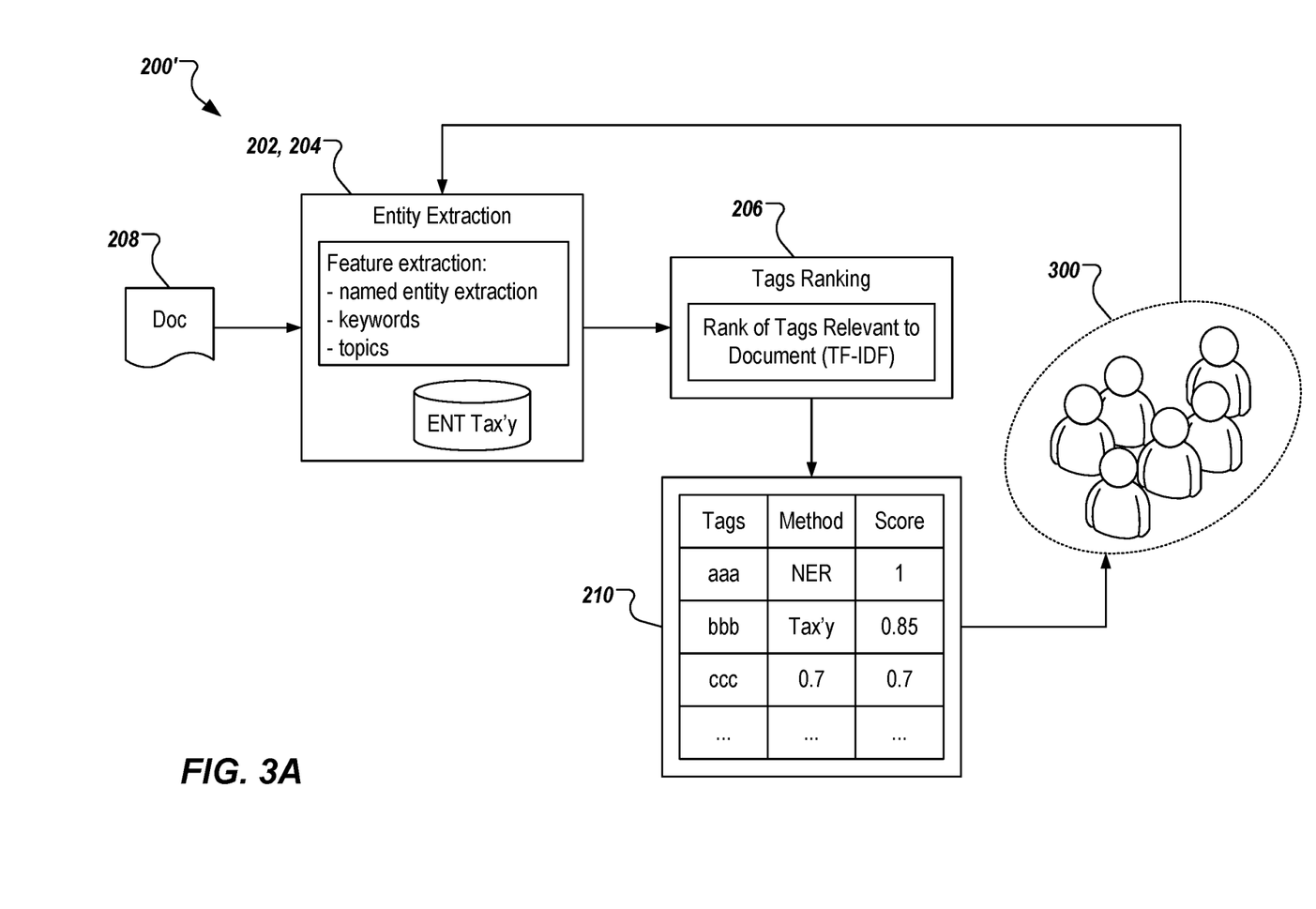
FIG. 3A depicts another example module architecture in accordance with implementations of the present disclosure.

FIG. 3A depicts another example module architecture 200' in accordance with implementations of the present disclosure. The example module architecture 200' includes entity extraction modules 202, 204 (depicted collectively), and the tags ranking module 206 to provide the tag rank 210. As depicted in FIG. 3A, one or more users 300 provide feedback to the entity extraction modules 202, 204 to adjust the tag rank 210. For example, the tag rank 210 can be displayed to a user (e.g., displayed to the user 120 on the computing device 102), and the user can provide input to the tag rank 210.

In some examples, user feedback is used for updating tag lists (e.g., changing the rank position of a tag, or adding a tag, and or automatically updating the enterprise-specific taxonomy. Each of these tasks is performed by leveraging conceptual similarity between documents, as well as the word embedding cloud. For example, the case of a group of documents can be considered, which are given the tags 'Artificial Intelligence' at rank 1 and 'Machine Learning' at rank 2 by the tagging algorithm. In this example, for the majority of these documents, users change the ranks of the provided tags so that 'Machine Learning' is at rank 1 and 'Artificial Intelligence' is at rank 2. Also in this example, for the majority of these documents, users add the tag 'GDPR'. In future documents with 'Artificial Intelligence' and 'Machine Learning' tags, the rankings will be automatically updated to reflect these changes. Furthermore, through the word embedding cloud, 'GDPR' will be automatically identified as being related to 'Artificial Intelligence'. This will result in an update to the 'Artificial Intelligence' branch of the enterprise-specific taxonomy to add 'GDPR' as a child concept.

Tables 1 and 2 respectively depict an original set of tags, and a set of tags after self-learning in accordance with implementations of the present disclosure. In comparing Table 1 to Table 2, it can be seen that the tag 'ccc' is of higher relevance after self-learning, and a new tag 'eee' has been added.

TABLE 1

Original Set of Tags

| Tag | Source | Score |
|-----|--------|-------|
| aaa | ET | 1.00 |
| bbb | T1 | 0.85 |
| ccc | T2 | 0.70 |
| ... | ... | ... |

TABLE 2

Set of Tags After Learning

| Tag | Source | Score |
|-----|--------|-------|
| ccc | T2 | 0.99 |
| eee | T2 | 0.80 |
| aaa | ET | 0.76 |
| ... | ... | ... |

Figure 3B:
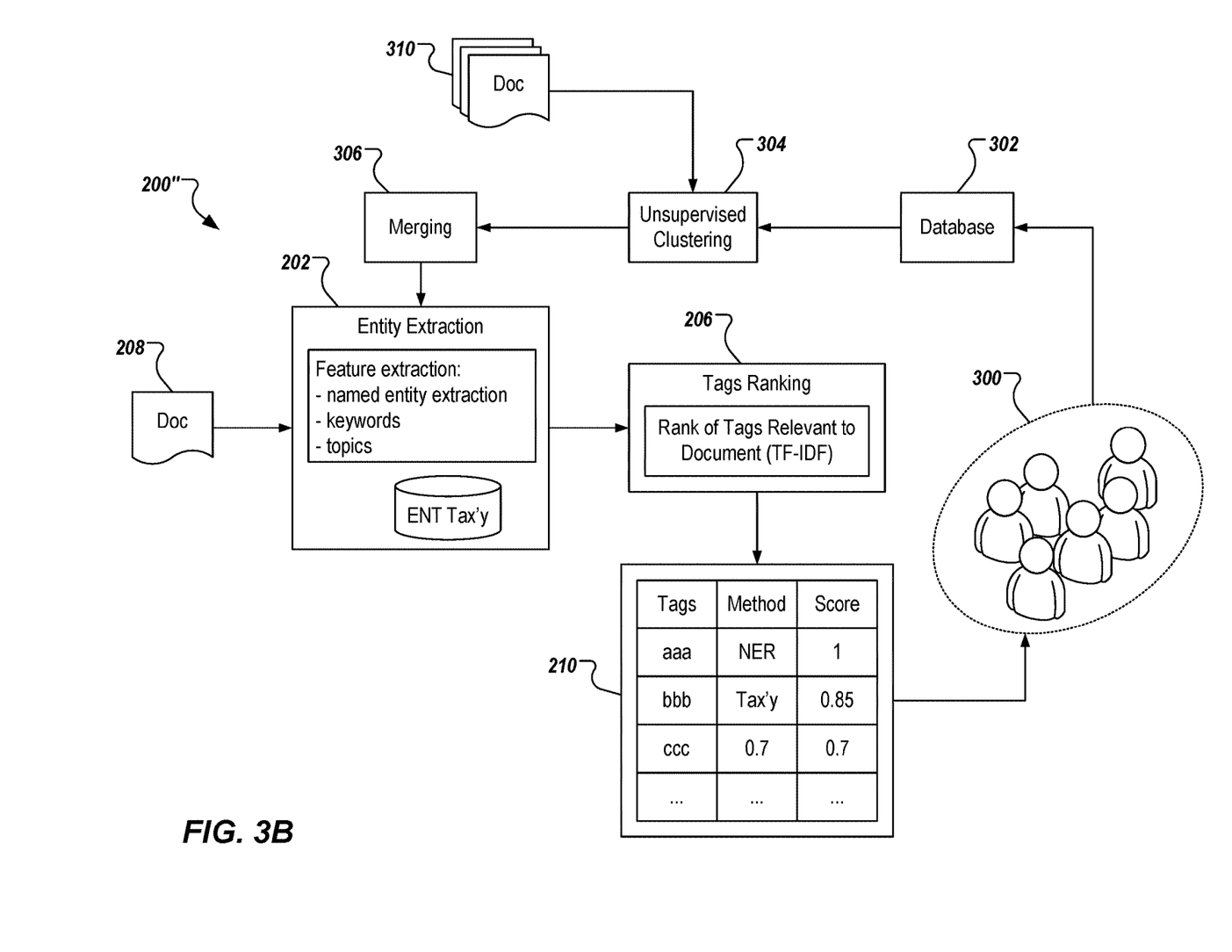
FIG. 3B depicts another example module architecture in accordance with implementations of the present disclosure.

FIG. 3B depicts another example module architecture 200" in accordance with implementations of the present disclosure. The example module architecture 200" includes the entity extraction module 202, 204, and the tags ranking module 206 to provide the tag rank 210, as well as the one or more users 300. The example module architecture 200" further includes a database 302, an unsupervised clustering module 304, a merging module 306, and a set of documents 310.

In some implementations, the user feedback is recorded to the database 302, and is provided as input to the unsupervised clustering module 304. The set of documents 310 includes documents of the enterprise. In some examples, the set of documents 310 includes documents that have been tagged, and have one or more tags associated therewith. In some implementations, the unsupervised clustering module 304 processes the set of documents 310 to provide a word embedding cloud. In some examples, the word embedding cloud is based on similarities of words, and where words appear together within documents of the set of documents (e.g., programming appears in the context of different languages, computers, memory). In general, the word embedding cloud represents conceptual similarity of words, and can be provided as a connected graph of words.

In some examples, user feedback can be provided from the database 302, and used to influence the word embedding cloud. For example, similarities between words can be strengthened/weakened based on the feedback. In some examples, one or more words can be added to the word embedding cloud based on the feedback. For example, as a word becomes relevant to documents of the enterprise, users can begin introducing the word through user feedback (e.g., prior to 2008, the term blockchain may not have been relevant to, or even at all used in documents of an enterprise). As emerging technologies, new platforms, and the like come into fashion and are integrated into operations of an enterprise, there can be a lag between a critical mass of documents referencing such things, and actual use within the enterprise. User feedback can be used to expand the one or more internal taxonomies to account for emerging topics, thereby maintaining the taxonomies.

Figure 4A:
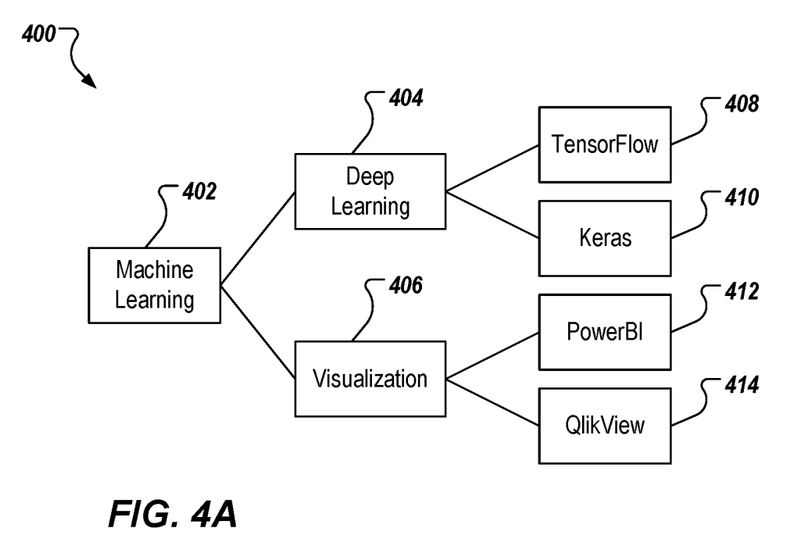
FIG. 4A depicts a portion of an example taxonomy before learning.
Figure 4B:
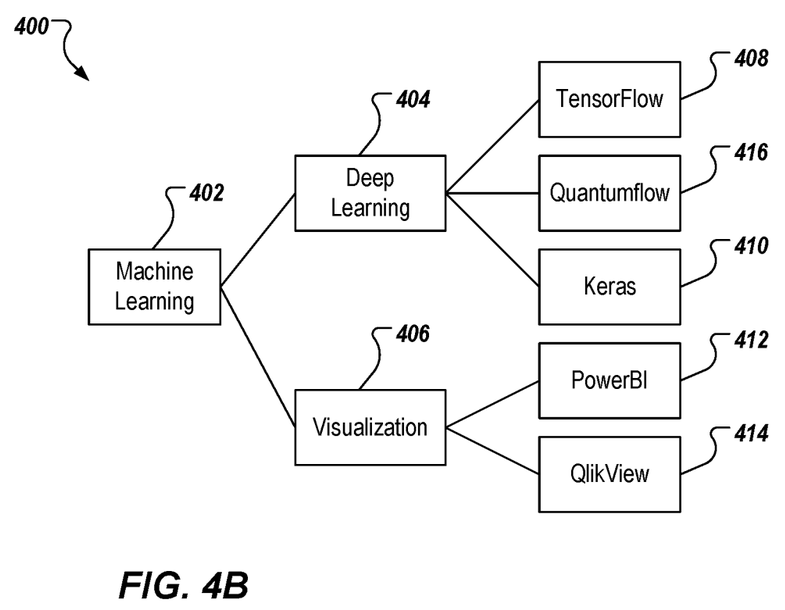
FIG. 4B depicts the portion of the example taxonomy after learning.

FIG. 4A depicts a portion of an example taxonomy 400 before learning. The example taxonomy 400 includes a root node 402, child nodes 404, 406, and leaf nodes 408, 410, 412, 414. FIG. 4B depicts the portion of the example taxonomy 400 after learning. The example taxonomy 400 includes a root node 402, child nodes 404, 406, and leaf nodes 408, 410, 412, 414, 416. In the examples of FIG. 4B, the leaf node 416 has been added. Accordingly, the taxonomy 400 has expanded based on user feedback, as described in detail herein. In this manner, a taxonomy, such as an enterprise-specific taxonomy can be maintained (e.g., terms added, terms removed, hierarchy changed).

Figure 5:
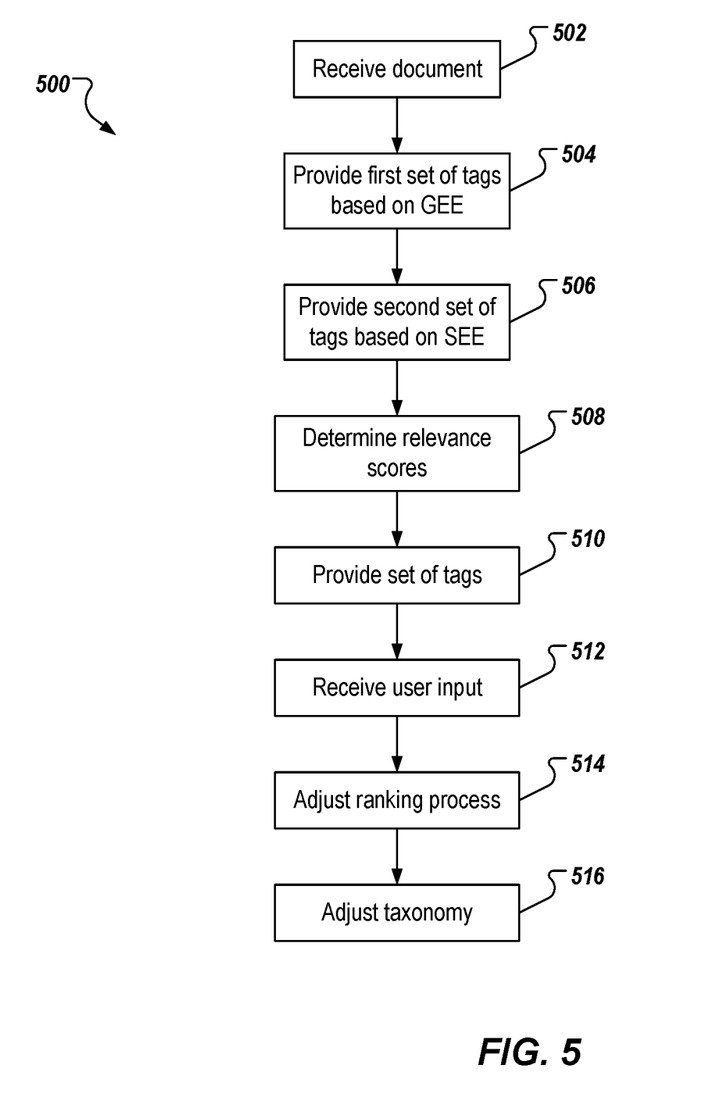
FIG. 5 depicts an example process that can be executed in implementations of the present disclosure.

FIG. 5 depicts an example process 500 that can be executed in implementations of the present disclosure. In some examples, the example process 500 is provided using one or more computer-executable programs executed by one or more computing devices (e.g., the back-end system 106 of FIG. 1).

A document is received (502). For example, the electronic document 208 is received by each of the GEE module 202, and the SEE module 204 of FIG. 2. A first set of tags is provided based on GEE (504). For example, and as described herein, the GEE module 202 processes the document 208 in view of one or more external taxonomies (e.g., not specific to the enterprise that maintains the document 208) to provide the first set of tags. A second set of tags is provided based on SEE (506). For example, and as described herein, the SEE module 204 processes the document 208 in view of one or more internal taxonomies (e.g., specific to the enterprise that maintains the document 208) to provide the second set of tags.

Relevance scores for tags are determined (508). For example, and as described herein, the tag ranking module 206 processes the tags using TF-IDF to determine respective relevance scores for the tags, and to rank the tags in order (e.g., tags with higher relevance scores are ranked higher than tags with lower relevance scores). A set of tags is provided (510). For example, the tag ranking module 206 outputs the set of tags 210, which is displayed to one or more users.

User input is received (512). For example, one or more users (e.g., the user 120 of FIG. 1) can provide user input indicating feedback to the document tagging platform. Example feedback can include, without limitation, changing a ranking of a tag, removing a tag, adding a tag. The ranking process is adjusted (514). For example, and as described herein with reference to FIG. 3A, user feedback can be processed by the entity extraction modules 202, 204 to learn from the user feedback, and influence subsequent tag ranking processes. The taxonomy is adjusted (516). For example, and as described herein with reference to FIG. 3B, user feedback can be processed to maintain the one or more internal taxonomies over time (e.g., add/remove tags).

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for tagging electronic documents, the method being executed by one or more processors and comprising:
   receiving an electronic document of an enterprise, the electronic document being untagged;
   providing a first set of tags by processing the electronic document using generic entity extraction based on one or more external taxonomies, each external taxonomy being generic to operations of the enterprise;
   providing a second set of tags by processing the electronic document using specific entity extraction based on matching words of the electronic document to words of the one or more internal taxonomies, each internal taxonomy being maintained by the enterprise and being specific to operations of the enterprise;
   determining a relevance score for each tag in the first set of tags and each tag in the second set of tags;
   defining a set of tags for tagging the electronic document, the set of tags comprising one or more tags of the first set of tags and one or more tags of the second set of tags, tags of the set of tags being in rank order based on respective relevance scores;
   receiving user input to the set of tags, the user input comprising one of changing a ranking of a tag, removing a tag, adding a tag;
   providing the user input to influence a word embedding cloud, the word embedding cloud representing conceptual similarity of words as a connected graph of words and is provided by an unsupervised clustering module that processes a set of tagged documents of the enterprise; and
   performing one or more of adjusting a ranking of tags based on the user input, and editing at least one internal taxonomy of the one or more internal taxonomies based on the user input and the word embedding cloud.

2. The method of claim 1, wherein tagging the electronic document comprises assigning one or more tags of the set of tags to the electronic documents.

3. The method of claim 1, wherein adjusting a ranking of tags comprises one of increasing a relevance score, and decreasing a relevance score of at least one tag in the set of tags.

4. The method of claim 1, wherein the relevance scores are determined based on processing each tag in the set of tags using term frequency inverse document frequency (TF-IDF).

5. The method of claim 1, wherein editing at least one internal taxonomy of the one or more internal taxonomies comprises adding at least one term within a hierarchy of the at least one internal taxonomy.

6. A non-transitory computer-readable storage medium coupled to one or more processors and having instructions stored thereon which, when executed by the one or more processors, cause the one or more processors to perform operations for tagging electronic documents, the operations comprising:

receiving an electronic document of an enterprise, the electronic document being untagged;

providing a first set of tags by processing the electronic document using generic entity extraction based on one or more external taxonomies, each external taxonomy being generic to operations of the enterprise;

providing a second set of tags by processing the electronic document using specific entity extraction based on matching words of the electronic document to words of the one or more internal taxonomies, each internal taxonomy being maintained by the enterprise and being specific to operations of the enterprise;

determining a relevance score for each tag in the first set of tags and each tag in the second set of tags;

defining a set of tags for tagging the electronic document, the set of tags comprising one or more tags of the first set of tags and one or more tags of the second set of tags, tags of the set of tags being in rank order based on respective relevance scores;

receiving user input to the set of tags, the user input comprising one of changing a ranking of a tag, removing a tag, adding a tag;

providing the user input to influence a word embedding cloud, the word embedding cloud representing conceptual similarity of words as a connected graph of words and is provided by an unsupervised clustering module that processes a set of tagged documents of the enterprise; and     performing one or more of adjusting a ranking of tags based on the user input, and editing at least one internal taxonomy of the one or more internal taxonomies based on the user input and the word embedding cloud.

7. The computer-readable storage medium of claim 6, wherein tagging the electronic document comprises assigning one or more tags of the set of tags to the electronic documents.

8. The computer-readable storage medium of claim 6, wherein adjusting a ranking of tags comprises one of increasing a relevance score, and decreasing a relevance score of at least one tag in the set of tags.

9. The computer-readable storage medium of claim 6, wherein the relevance scores are determined based on processing each tag in the set of tags using term frequency inverse document frequency (TF-IDF).

10. The computer-readable storage medium of claim 6, wherein editing at least one internal taxonomy of the one or more internal taxonomies comprises adding at least one term within a hierarchy of the at least one internal taxonomy.

11. A system, comprising:
    one or more processors; and
    a computer-readable storage device coupled to the one or more processors and having instructions stored thereon which, when executed by the one or more processors, cause the one or more processors to perform operations for tagging electronic documents, the operations comprising:

receiving an electronic document of an enterprise, the electronic document being untagged;

providing a first set of tags by processing the electronic document using generic entity extraction based on one or more external taxonomies, each external taxonomy being generic to operations of the enterprise;

providing a second set of tags by processing the electronic document using specific entity extraction based on matching words of the electronic document to words of the one or more internal taxonomies, each internal taxonomy being maintained by the enterprise and being specific to operations of the enterprise;

determining a relevance score for each tag in the first set of tags and each tag in the second set of tags;

defining a set of tags for tagging the electronic document, the set of tags comprising one or more tags of the first set of tags and one or more tags of the second set of tags, tags of the set of tags being in rank order based on respective relevance scores;

receiving user input to the set of tags, the user input comprising one of changing a ranking of a tag, removing a tag, adding a tag;

providing the user input to influence a word embedding cloud, the word embedding cloud representing conceptual similarity of words as a connected graph of words and is provided by an unsupervised clustering module that processes a set of tagged documents of the enterprise; and     performing one or more of adjusting a ranking of tags based on the user input, and editing at least one internal taxonomy of the one or more internal taxonomies based on the user input and the word embedding cloud.

12. The system of claim 11, wherein tagging the electronic document comprises assigning one or more tags of the set of tags to the electronic documents.

13. The system of claim 11, wherein adjusting a ranking of tags comprises one of increasing a relevance score, and decreasing a relevance score of at least one tag in the set of tags.

14. The system of claim 11, wherein the relevance scores are determined based on processing each tag in the set of tags using term frequency inverse document frequency (TF-IDF).

15. The system of claim 11, wherein editing at least one internal taxonomy of the one or more internal taxonomies comprises adding at least one term within a hierarchy of the at least one internal taxonomy.

\* \* \* \* \*